United States Patent
Braunecker et al.

[11] Patent Number: 5,966,243
[45] Date of Patent: Oct. 12, 1999

[54] PROCESS FOR CORRECTING WAVE FRONT DEFORMATIONS

[75] Inventors: Bernhard Braunecker, Rebstein; Massimo Biber, Balgach, both of Switzerland

[73] Assignee: Leica Geosystems AG, Heerbrugg, Switzerland

[21] Appl. No.: 08/945,320

[22] PCT Filed: Apr. 26, 1996

[86] PCT No.: PCT/EP96/01768

§ 371 Date: Oct. 23, 1997

§ 102(e) Date: Oct. 23, 1997

[87] PCT Pub. No.: WO96/35137

PCT Pub. Date: Nov. 7, 1996

[30] Foreign Application Priority Data

May 2, 1995 [DE] Germany ............... 195 16 017

[51] Int. Cl.$^6$ .................................................. G02B 13/00
[52] U.S. Cl. ............................................ 359/642; 359/668
[58] Field of Search .............................. 359/642, 708, 359/668–771

[56] References Cited

U.S. PATENT DOCUMENTS 5,289,254 2/1994 Braunecker et al. .................. 356/124
5,294,971 3/1994 Braunecker et al. .................. 356/121

FOREIGN PATENT DOCUMENTS 40 03 699 9/1992 Germany.
40 03 698 9/1994 Germany.

OTHER PUBLICATIONS

M. Born et al., "Electromagnetic Theory of Propagation, Interference and Diffraction of Light", Principles of Optics, Pergamon Press, sixth edition, pp. 464–465.

DIN Standard Sheet 3140, Part 5, Oct. 1978, pp. 3–4.

*Primary Examiner*—Scott J. Sugarman
*Attorney, Agent, or Firm*—Foley & Lardner

[57] ABSTRACT

A process is disclosed for correcting wave front deformations caused by an optical system (5). The wave front deformations are measured by means of a wave front measurement instrument. Based on the measurement results, at least two optical components are selected as optical correcting elements (1, 2) from a series of prefabricated optical components, for example cylindrical, with form errors of different types and magnitudes. They are then mutually aligned and brought into the path of the rays of the optical system (5). This process meets high tolerance requirements an may be easily and quickly applied in the course of manufacture of an optical system (5).

15 Claims, 4 Drawing Sheets

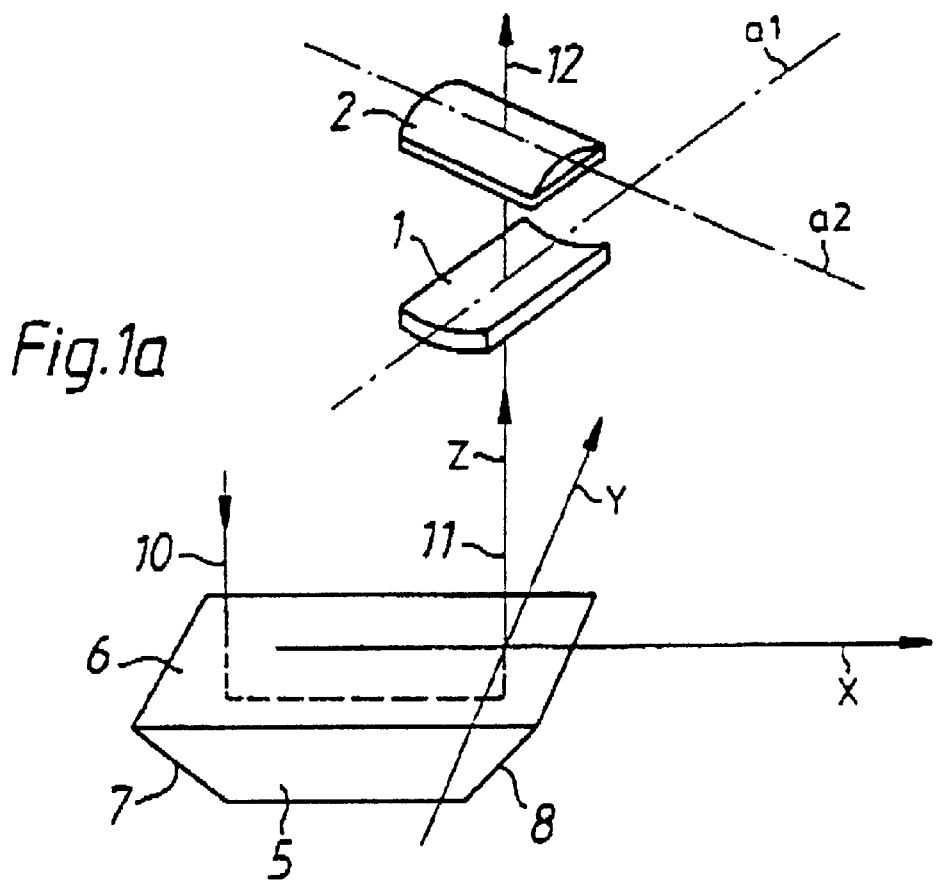
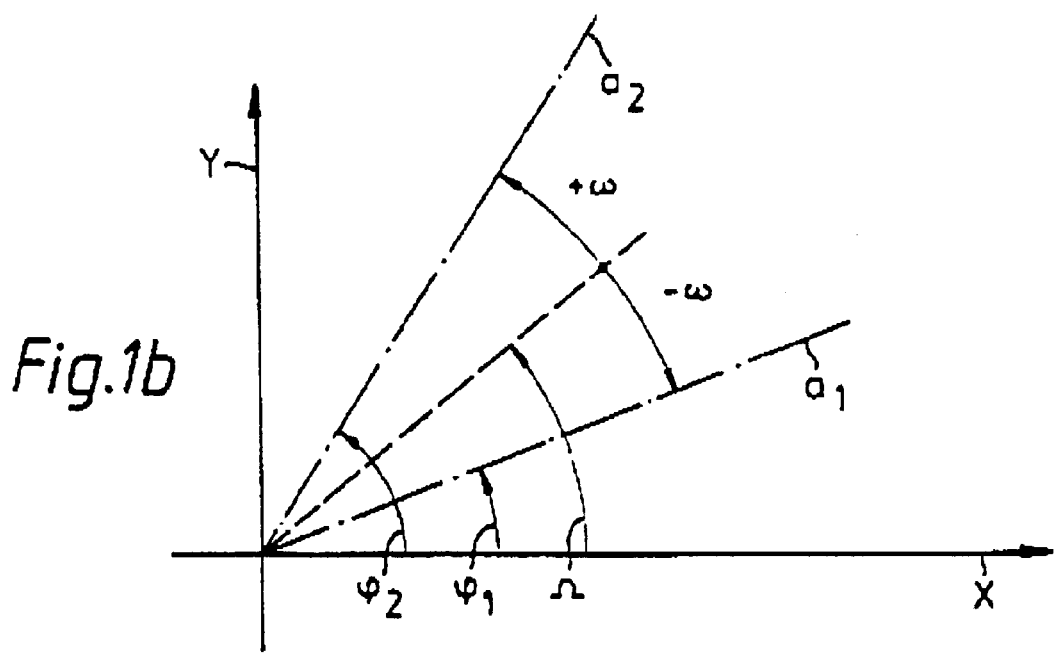

PROCESS FOR CORRECTING WAVE FRONT DEFORMATIONS

BACKGROUND

The invention relates to a process for correcting wavefront deformations which are caused by an optical system and which are measured with the aid of a wave-front-measuring instrument.

An optical system is to be understood both as an arrangement of optical components to form a functional unit, and as an individual optical component.

In accordance with its particular function, each optical system effects a specific variation in incident wavefronts. For example, plane wavefronts are converted into spherical wavefronts by an imaging optical system. However, there are deviations from the ideal shape of the wavefront upon passage through a real optical system. Wavefront deformations are produced whose causes are grounded chiefly in the non-ideal characteristics of the surfaces of the individual optical components which form the optical system. These errors in the surfaces are denoted as surface form errors or simply as form errors. Material inhomogeneities and the cementing of the optical components also play a role in causes form errors.

The errors caused in the wavefronts are composed of different error components. In particular the surface roughnesses unavoidably produced on optical components during polishing processes cause disturbed wavefronts whose disturbance or deformation is classified as 3/A (B) in accordance with DIN Standard Sheet 3140, Part 5, October 1978, pages 3-4, code number for permissible form errors. In this case, A is a measure of the spherical form error, that is to say the deviation of the surface shape from a test glass, specified by the number of Newton rings, where B describes the oval form error, that is to say the astigmatic component, likewise in the same units. The remainder of the wavefront deformation is mostly negligible in the case of the production process at issue.

The wavefront deformations can be measured with wavefront-measuring instruments such as are described, for example, in DE 40 03 698 C2 or in DE 40 03 699 C2. If the wavefront deformations measured at individual optical components or at a group of composite optical components exceed a prescribed tolerance limit, these components are taken out of the further production process and returned for reworking to a preceding process step. The reworking is performed generally only at very specific points of the optical component, which have been determined from measurement of the wavefront deformations. During the reworking, an appropriate correction is polished into the optical component. The correction acts on the wavefront as a counterdisturbance, as a result of which the original wavefront deformation is corrected up to a certain degree.

However, difficulties arise when there are high requirements for correcting the wavefront deformations. If there is a requirement for deviations from the desired ideal shape of the wavefront, where the deiration which are smaller than the wavelengths of visible light, there is an increase in the number of the optical components which exceed this tolerance limit and which therefore have to be removed from the production cycle. If, however, the rate of rejection is too high, it is no longer sensible to return the rejected optical components to a preceding process step for the purpose of correction. Firstly, frequent intervention in the fabrication cycle is very expensive in terms of time and cost and hampers fluid production. Secondly, there is a rise in the risk that a subsequent polishing process will produce additional errors. In some circumstances, more new errors will be produced than there were original errors present. Since the original errors can no longer be satisfactorily limited, limits of mastering the process have been reached. In order to achieve substantial improvements, a basically different production method would have to be developed at great expense.

SUMMARY OF THE INVENTION

It is therefore an object of the invention to use simple means and a low outlay on time to eliminate the wavefront deformations caused by an optical system to such an extent that the tolerance limits for the wave-front deformations are smaller than the wavelengths of visible light.

This object is achieved according to one embodiment of the invention by virtue of the fact that introduced into the beam path of the optical system are at least two optical correcting elements which are selected from a series of prefabricated optical components, provided with form errors of different types and magnitudes, as a function of the results of the wavefront deformations measured with the wavefront-measuring instrument, and are aligned relative to one another and to the optical system.

Advantageous developments and improvements of the invention are defined by the features described below.

According to an embodiment of the invention, prefabricated optical correcting elements are used to correct the wavefront deformations. Such elements are preferably plane plates which are provided with form errors of different types and magnitudes. The form errors are, for example, polished into the plane plates.

Most optical components or systems give rise to predominantly spherical and astigmatic wavefront deformations as a result of the polishing process. Consequently, plane plates with spherical and cylindrical form errors can correct such wavefront deformations. In this case, spherical and cylindrical form errors can be incorporated simultaneously in a plane plate. However, it is substantially simpler in terms of production engineering to polish exclusively spherical form errors in plane plates and exclusively cylindrical form errors in other plane plates. The form errors have a positive or negative sign depending on the converging or diverging effect. The specification of the magnitude of a form error therefore provides the absolute magnitude with a sign.

According to an embodiment of the invention, from a series of plane plates prefabricated in such a way and incorporating cylindrical and/or spherical form errors of different magnitude, two or more such plane plates are selected in such a way and aligned mutually and relative to the optical system in such a way that they correct the wavefront deformations produced by the optical system. For this purpose, the wavefront deformations are firstly measured with the aid of a wavefront-measuring instrument. It is preferred for the measured wavefront deformations to be described mathematically by Zernike polynomials. The coefficients of the Zernike polynomials are determined thereby. On the other hand, the form errors built into the plane plates can likewise be described by Zernike polynomials, as can also the form errors resulting from a combination of such plane plates. The coefficients of the Zernike polynomials can be expressed in this case by the magnitude of the form errors and by the mutual alignment of these plane plates. Consequently, given a selection of two plane plates having form errors of known magnitude, it is possible to determine the mutual alignment of said plane plates and their alignment relative to the optical system so that they can have the overall effect of correcting the wavefront deformations.

The following example shows the effect of two cylindrical filters. If two cylindrical filters of the same sign and equal absolute magnitude are aligned at an angle of 0° relative to one another in the case of an incident plane wave, the result is a purely cylindrical wavefront. A purely spherical wavefront results in the case of a 90° alignment of the cylindrical filters relative to one another. If the cylindrical filters have a different sign in conjunction with the same absolute magnitude, the plane wavefront is maintained in the case of 0° alignment of the cylindrical filters, while in this case a purely cylindrical wavefront is produced at an angle of 90°. Corresponding spherical and cylindrical components of the wavefront are produced for all other crossing angles. The ratio of the spherical components to the cylindrical one varies continuously with the crossing angle. Two cylindrical filters of suitable dimension are therefore sufficient to be able to correct wavefront deformations.

Consequently, a series of plane plates incorporating positive cylindrical form errors, and of plane plates incorporating negative cylindrical form errors of the same absolute magnitude in each case are produced as optical correcting elements and stored. During the process of fabricating optical components or systems, the wavefronts altered by these systems are measured using the wavefront measuring instrument. On the basis of the measured wavefront-deformations, suitable correcting elements are taken from the store and cemented to or brought into optical contact with the optical component or elements of the optical system in the alignment determined by the measurement. As an alternative to this, the optical correcting elements can be firstly assembled in the mutual alignment determined to form a compensator module. The compensator module is then introduced, aligned for its part, into the beam path of the optical system.

In addition to said cylindrical filters, it is also possible to use plane plates incorporating spherical form errors of different magnitude as optical correcting elements. Correcting elements with spherical form errors are lighter and more cost effective to produce than those with cylindrical form errors. However, a series of correcting elements with spherical form errors is not sufficient to be able to correct the types of wavefront deformations which occur. It is also necessary to provide plane plates with cylindrical form errors, form error magnitudes of only one sign being sufficient, however. In this case, three correcting elements are generally required for correcting wavefront deformations.

An important advantage of the method described is that it is possible to correct wavefront deformations of different shape and magnitude with the aid of only a small number of two or three optical correcting elements. The correction of wavefront deformations is therefore performed quickly and with simple means in the course of the process of producing optical components and systems. The need is eliminated for already fabricated optical components or systems which do not meet the specification to be included once more for reworking in a preceding fabrication process.

Moreover, it is proved that this method succeeds in correcting wavefront deformations to only fractions of the optical wavelengths. This renders a substantially better correction possible than can be achieved by reworking the fabricated optical system. The tolerance limit due to the fabrication process is clearly under-shot, and a better result is thereby achieved.

Exemplary embodiments of the invention are explained in more detail below with the aid of the drawing,

BRIEF DESCRIPTION OF THE DRAWINGS

FIG. 1a shows a diagrammatic representation of two optical correcting elements for correcting the wavefront deformations caused by a prism.

FIG. 1b shows a coordinate system for defining the angles.

DETAILED DESCRIPTION OF EXEMPLARY EMBODIMENTS

Figure 2:
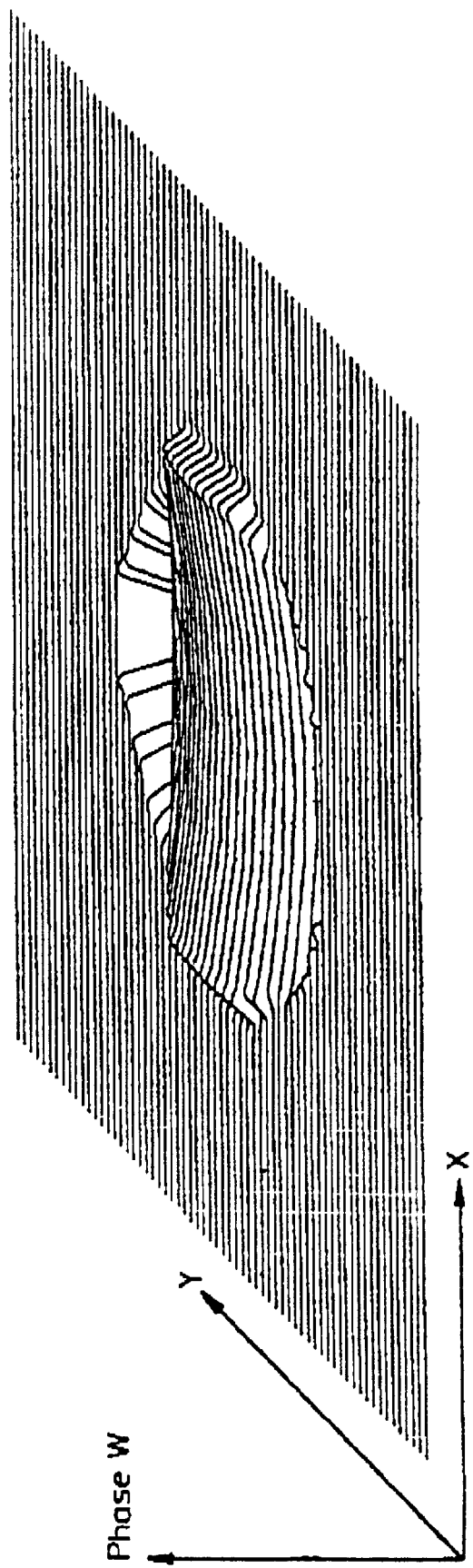
FIG. 2 shows wavefront deformations produced by the prism according to FIG. 1 and measured by means of a wavefront-measuring instrument.

A prism 5 and two optical correcting elements 1 and 2 are represented diagrammatically in FIG. 1a. A light beam 10 consisting of parallel light rays falls perpendicularly onto the surface 6 of the prism 5. The light beam 10 is reflected inside the prism 5 on the faces 7 and 8 of the prism 5. It leaves the prism 5 again through the surface 6 and is thereafter denoted as light beam 11. Since the faces 7 and 8 of the prism 5 form an angle of 45° relative to the incident light beam 10, the prism 5 acts as a retroreflector, with the result that the incident light beam 10 and the light beam 11 emerging from the prism 5 extend in parallel.

In the wave pattern, the parallel light rays of the light beam 10 signify a plane electromagnetic wave whose direction of propagation is perpendicular to the plane wavefronts. The plane wavefronts thus extend parallel to the surface 6 of the prism 5. Since the surfaces 6, 7 and 8 of the prism 5 have local deviations from ideally plane areas because of the production process, and since it is also possible for material inhomogeneities, which influence the refractive index, to occur inside the prism 5, for example, the electromagnetic wave emerges with corresponding wavefront deformations from the prism 5. The wavefront deformations of the emerging light beam 11 are measured with the aid of a wavefront-measuring instrument (not represented). The measurement results are used to select suitable optical correcting elements 1 and 2 from a series of prefabricated optical correcting elements, and to determine the alignment of the optical correcting elements 1 and 2 relative to one another and likewise to the coordinates x and y of the prism 5. The alignments are given by the angles $\phi_1$ and $\phi_2$, which the axes a1 and a2 of the correcting elements 1 and 2 form relative to the x-axis in the x-y plane of the coordinate system x, y, z of the prism 5 (FIG. 1). The optical correcting elements 1 and 2 are represented as negative and positive cylindrical filters. The wavefront deformations of the light beam 11 which are caused by the prism 5 are corrected by the optical correcting elements 1 and 2, with the result that the light beam 12 emerging therefrom again contains plane wavefronts.

The generally known Zernike polynomials (BORN, Max, WOLF, Emil: Principles of Optics, 6th Edition Oxford, New York: Pergamon Press, 1980, p. 464) are preferred for the mathematical description of the measured wavefront deformations. The measured wavefront is decomposed in accordance with the Zernike polynomials, the coefficients of the Zernike polynomials thus being determined. On the other hand, coefficients of the Zernike polynomials for the cylindrical filters 1, 2 shown in FIG. 1a can be represented as equations in the following way.

After the cylindrical filters 1 has been passed, it holds for the phase $W_1$ of the wavefront that $$W_1 = C_1 + C_1 \cdot \{2\rho^2 - 1\} - 2C_1\rho^2 \cdot \{\cos 2\alpha \cos \phi_1 + \sin 2\alpha \sin 2\phi_1\}$$

where $C_1 = (n-1) \cdot /8 \cdot A_1$.

Here, $\phi_1$ denotes the azimuth angle relative to the x-axis, $\rho$ and $\alpha$ the polar coordinates in the x-y plane, n the refractive index of the cylindrical filter 1, $\lambda$ the light wavelength and $A_1$ the number of Newton rings in accordance with the classification according to DIN 3140, which represents a measure of the magnitude of the form error.

It holds analogously for the cylindrical filters 2 that $$W_2 = C_2 + C_2 \cdot \{2\rho^2 - 1\} - 2C_2\rho^2 \cdot \{\cos 2\alpha \cos 2\phi_2 + \sin 2\alpha \sin 2\phi_2\}$$

where $C_2 = (n-1)\lambda/8 \cdot A_2$.

It is expedient to redefine the azimuth angles $\phi_1, \phi_2$ of the two cylinder axes a1, a2 as:

$\Omega = (\phi_1 + \phi_2)/2$ $\omega = (\phi_2 - \phi_1)/2$

These angle relationships are represented visually in FIG. 1b.

It follows for the phase W of the wavefront upon combining the cylindrical filters 1 and 2 that $$W = W_1 + W_2$$
$$= D_1 + D_3 \cdot Z_3 + D_4 \cdot Z_4 + D_5 \cdot Z_5$$

where $D_1 = D_3 = (n-1) \cdot \lambda/8 \cdot \{A_1 + A_2\}$ $D_4 = -(n-1) \cdot \lambda/4 \cdot \{A_1 \cdot \cos 2 (\Omega - \omega) + A_2 \cdot \cos 2 (\Omega + \omega)\}$, $D_5 = -(n-1) \cdot \lambda/4 \cdot \{A_1 \cdot \sin 2 (\Omega - \omega) + A_2 \cdot \sin 2 (\Omega + \omega)\}$ and the Zernike polynomials $Z_3 = 2\rho^2 - 1$; $Z_4 = \rho^2 \cos 2\alpha$, $Z_5 = \rho^5 \sin 2\alpha$.

Knowing the form error magnitudes $A_1$ and $A_2$ of the cylindrical filters 1, 2, it is possible to determine their crossing angle $\Omega$ and installation angle $\Omega$ from the equations for the coefficients $D_1$, $D_3$, $D_4$ and $D_5$ of the Zernike polynomials of the crossed cylindrical filters 1, 2 with the aid of the values of the coefficients $D_1$, $D_3$, $D_4$ and $D_5$ determined from the measured wavefront deformation.

Thus, it is possible to select at least two correcting elements 1, 2 from a series of prefabricated optical correcting elements 1, 2 provided with different form errors in such a way that it is easy to set the angles relative to the coordinate system of the prism 5. It goes without saying that in a very rarely occurring case in which an optical system produces wavefront deformations of only one single type there is also a need for only one single optical correcting element of corresponding type and corresponding magnitude for correcting the error in the wavefront.

An optical system generally comprises not only a prism such as the prism 5 represented by way of example. It can also be composed of further non-imaging optical functional elements and/or imaging optical functional elements such as lenses, curved mirrors, holograms, etc. All the functional elements of such an optical system contribute to deformations in the wavefronts entering the optical system. Of course, the wavefront deformations produced as a whole after passage of the optical radiation through an optical system thus composed are also corrected in accordance with the described method according to the invention.

FIG. 2 shows the wavefront produced by the prism 5 of FIG. 1 and measured by means of a wavefront-measuring instrument. The phase W of the wavefront is plotted as a function of location in the x-y plane. With respect to the plane illustrated, the phases W of the wavefront lag in the middle of the beam 11, while they lead on the left-hand and, in particular, on the right-hand edge of the beam 11.

Figure 3:
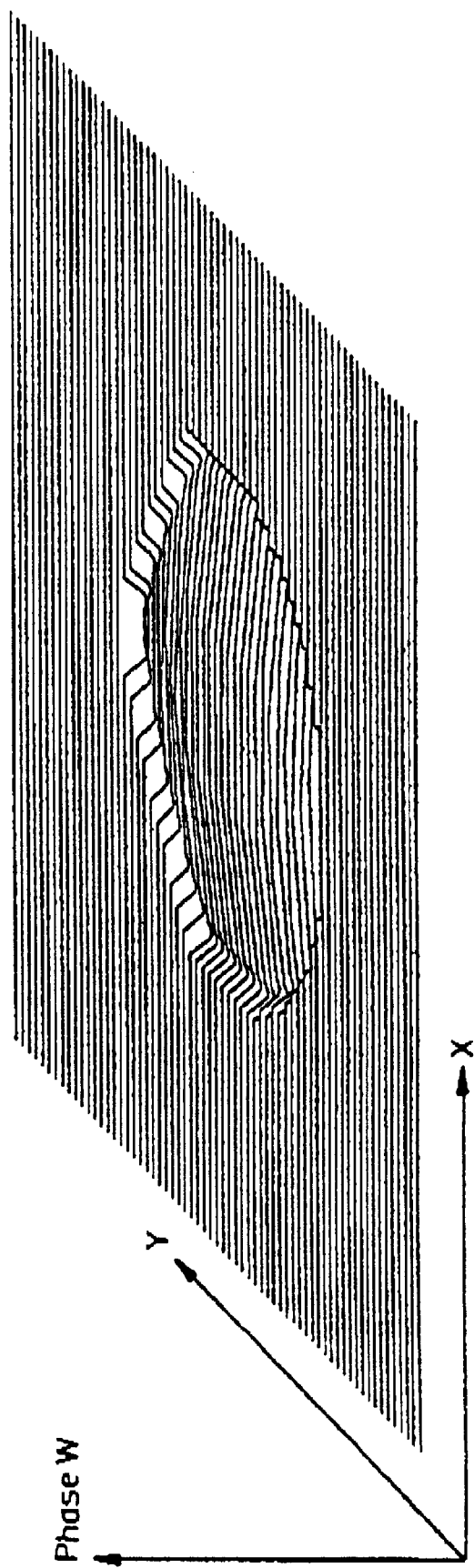
FIG. 3 shows the corrected effect of the optical compensation elements according to FIG. 1 on the wavefront deformations according to FIG. 2.

The effect of the optical correcting elements 1, 2 on the wavefront deformations shown in FIG. 2 is to be seen in FIG. 3. After passage of the light through the optical correcting elements 1, 2, the phase W of the wavefront is virtually constant over the entire cross section of the beam 12. The deviations from an ideal plane are only fractions of the visible light wavelength and are thus within the required tolerance limit.

Figure 4:
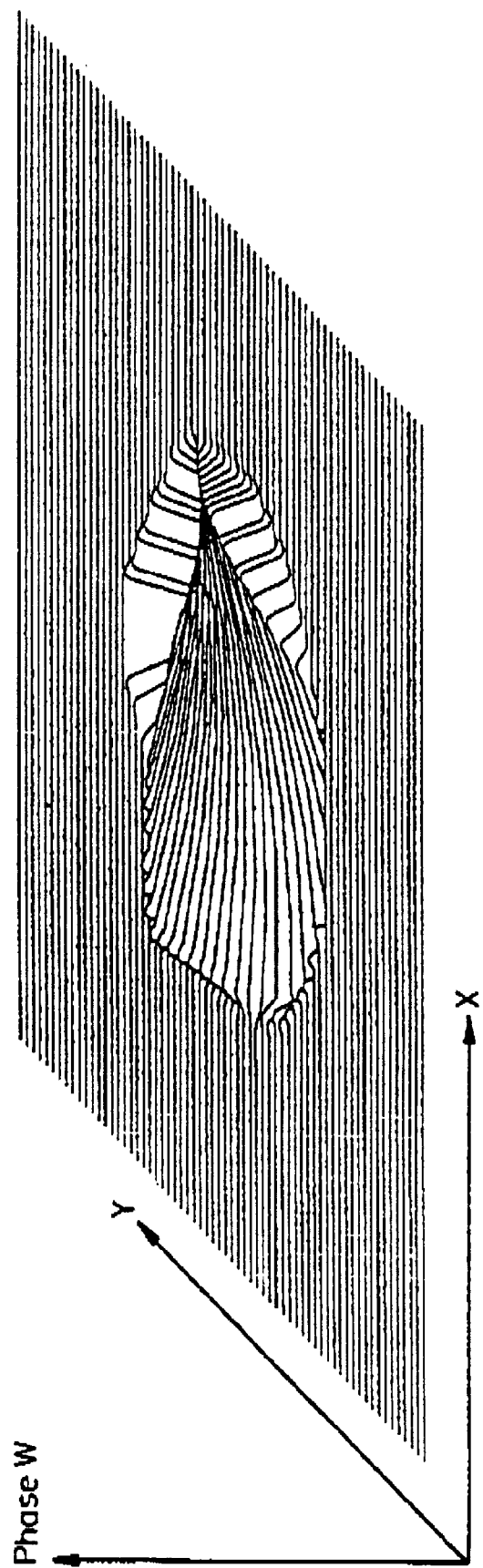
FIG. 4 shows wavefront deformations produced by arbitrary, mutual rotation of the optical correcting elements.

FIG. 4 shows wavefront deformations in the case of an arbitrary rotation of the optical correcting elements 1 and 2 from their optimum position in accordance with FIG. 3.

What is claimed is:

1. Process for correcting wavefront deformations which are caused by an optical system (5) and which are measured with the aid of a wavefront-measuring instrument, characterized in that introduced into the beam path of the optical system (5) are at least two optical correcting elements (1, 2) which are selected from a series of prefabricated optical components, where the prefabricated optical components are prefabricated to include form errors of different types and magnitudes, as a function of the results of the wavefront deformations measured with the wavefront-measuring instrument, and are aligned relative to one another and to the optical system.

2. Process according to claim 1, characterized in that the series of prefabricated optical correcting elements (1, 2) are represented by plane plates incorporating cylindrical and/or spherical form errors of different magnitude.

3. Process according to claim 2, characterized in that the series of prefabricated optical correcting elements (1, 2) are represented by a series of plane plates incorporating positive cylindrical form errors, and a series of plane plates incorporating negative cylindrical form errors of the same absolute magnitude in each case.

4. Process according to claim 2, characterized in that the series of prefabricated optical correcting elements (1, 2) are represented by a series of plane plates incorporating spherical form errors of different magnitude, and by a series of plane plates incorporating cylindrical form errors of different magnitude but with a uniform sign.

5. Process according to claim 1, characterized in that the individual optical correcting elements (1, 2) selected for correcting the wavefront deformation and aligned relative to one another and to the optical system (5) are cemented on or optically contacted with elements of the optical system.

6. Process according to claim 1, characterized in that the optical correcting elements (1, 2) selected for correcting the wavefront deformation and aligned relative to one another are assembled to form a compensator module, and in that the compensator module aligned relative to the optical system (5) is introduced into the beam path of the optical system (5).

7. Process according to claim 1, characterized in that the alignment of the correcting elements (1, 2) is performed directly in accordance with angular dimensions which were calculated from the characteristic of the wavefront deformation.

8. A process for correcting wavefront deformations which are caused by an optical system and which are measured with the aid of a wavefront-measuring instrument comprising:

introducing at least two optical correcting elements into a beam path of the optical system, wherein the at least two optical correcting elements are selected from a series of prefabricated optical components prefabricated with form errors of different types and magnitudes, and wherein the at least two optical correcting elements are selected based on the results of the wavefront-measuring instrument; and aligning the at least two optical correcting elements relative to one another and to the optical system to reduce the wavefront deformations caused by the optical system.

9. The process of claim 8, wherein the series of prefabricated optical components include plane plates incorporating cylindrical or spherical form errors of different magnitude.

10. The process of claim 9, wherein the series of prefabricated optical components include a series of plane plates incorporating positive cylindrical form errors, and a series of plane plates incorporating negative cylindrical form errors, wherein each of the plane plates incorporating negative cylindrical form errors corresponds to one of the plane plates incorporating positive cylindrical errors with a form error of the same absolute magnitude.

11. The process of claim 9, wherein the series of prefabricated optical components include a series of plane plates incorporating spherical form errors of different magnitude, and a series of plane plates incorporating cylindrical form errors, wherein the form errors of the plane plates incorporating cylindrical form errors are of a different magnitude than the form errors of the plane plates incorporating spherical form errors, but of the same sign.

12. The process of claim 8, further comprising:

optically contacting the at least two optical correcting elements with elements of the optical system.

13. The process of claim 8, further comprising:

cementing the at least two optical correcting elements with elements of the optical system.

14. The process of claim 8, further comprising:

assembling the at least two optical correcting elements which are aligned relative to one another to form a compensator module; and introducing the compensator module into the beam path of the optical system.

15. The process of claim 8, wherein the aligning the at least two optical correcting elements is performed according to angular dimensions calculated from the characteristics of the wavefront deformation.

* * * * *